United States Patent [19]
Turner

[11] 3,758,598
[45] Sept. 11, 1973

[54] SYNTHESIS OF ALIPHATIC AND ALICYCLIC ETHERS

[75] Inventor: John O. Turner, West Chester, Pa.

[73] Assignee: Sun Oil Company, Philadelphia, Pa.

[22] Filed: Dec. 14, 1970

[21] Appl. No.: 98,036

Related U.S. Application Data

[63] Continuation-in-part of Ser. No. 873,093, Oct. 31, 1969, abandoned.

[52] U.S. Cl. ...... 260/614 R, 260/611 R, 260/615 A
[51] Int. Cl. ............................................ C07c 41/00
[58] Field of Search .................. 260/614 R, 611 R, 260/610 R, 615 A

[56] References Cited
OTHER PUBLICATIONS

Hawkins et al., J. Chem. Soc. (1950), pp. 2804–2808.

*Primary Examiner*—Howard T. Mars
*Attorney*—George L. Church, Donald R. Johnson, Wilmer E. McCorquodale, Jr. and Stanford M. Back

[57] ABSTRACT

Aliphatic and alicyclic hydroperoxides may be converted to their corresponding ethers by reacting said hydroperoxides with a suitable alcohol in the presence of an acid and a metal catalyst.

8 Claims, No Drawings

SYNTHESIS OF ALIPHATIC AND ALICYCLIC ETHERS

CROSS-REFERENCE TO RELATED APPLICATION

This application is a continuation-in-part of U.S. Ser. No. 873,093, filed Oct. 31, 1969 and now abandoned, in the name of John O. Turner and entitled "IMPROVED SYNTHESIS OF ALIPHATIC AND ALICYCLIC ETHERS."

BACKGROUND OF THE INVENTION

This invention reltates to an improved process for the production of aliphatic and alicyclic ethers. More particularly, this invention relates to the increased rate of conversion of aliphatic and alicyclic hydroperoxides to the corresponding ethers by reacting them with a suitable alcohol in the presence of an acid and a metal catalyst.

In copending application, U.S. Ser. No. 873,094, filed Oct. 31, 1969, in the name of John O. Turner there is described a novel method for converting aliphatic and alicyclic hydroperoxides to the corresponding ethers which comprises contacting said hydroperoxides with a suitable alcohol in the presence of an acid catalyst. This method, while unique and highly effective, nevertheless is characterized in (1) having a reaction time of from about 5 to as much as about 40 hours or more, and generally from about 10 to 20 hours; and (2) requiring an acid concentration of 30 to 60 weight percent based on the weight of the acid-alcohol mixture. Thus, an increase in the reaction rate of this process at a lower acid concentration would be highly desirable in that it would permit the use of much smaller reactors to obtain the same yield, or alternatively increases the yield with time, while at the same time avoiding the use of highly concentrated acids and effecting a cost savings as well.

SUMMARY OF THE INVENTION

It has now been found, in accordance with the present invention, that the reaction rate in the conversion of aliphatic and alicyclic hydroperoxides to the corresponding ethers can be enhanced together with some increase in yield, by contacting said hydroperoxides with a suitable alcohol in the presence of an acid and a metal catalyst, wherein the acid concentration is less than 30 weight percent based on the weight of the acid-alcohol mixture.

DESCRIPTION OF THE INVENTION

This process is conveniently carried out by simply mixing the desired hydroperoxide starting material in a suitable alcoholic acid medium for about one-half to 5 hours, and preferably for about 2 to 4 hours, in the presence of a metal salt catalyst, and recovering the resulting ether.

In order to assure optimum results, it is important that the ratios of the hydroperoxide, the acid, the alcohol and the metal salt be kept within certain specified ranges. Thus, the alcohol should be present in a two-to-twelve-fold molar excess, based on the moles of hydroperoxide, and preferably from about a seven-to-ten-fold molar excess of the alcohol.

The amount of acid should, as mentioned above, be based on the amount of alochol present in order to provide a 5 to 30 weight percent concentration of the acid based on the total weight of the acid-alcohol mixture. The preferred weight percent of acid is about 15 to 20 percent. In carrying out this reaction, it has been found to be particularly advantageous, after removing the ether from the reaction mixture, to recycle the acid to the reaction medium after addition of sufficient alcohol to readjust the acid concentration to the desired level, thereby enhancing the yield of ether which is otherwise entrapped with the acid.

The acid employed should be a concentrated acid, as for example, hydrochloric, phosphoric, polyphosphoric, sulfuric, perchloric, various sulfonic acids or the like, as well as acid-treated molecular sieves. Preferably, the acid is sulfuric acid in concentrations of from about 90 percent to 20 percent oleum.

The alcohol is desirably a lower aliphatic alcohol having from 1 to 4 carbon atoms. Of these, methanol is preferred. However, depending upon the alkyl moiety desired in forming the resulting ether, other alcohols may be employed instead. Thus, for example, if ethyl t-butyl ether is desired rather than methyl t-butyl ether, then ethanol should be selected in place of methanol as the reactant.

The metal salts used as catalysts in this process along with the acids are generally those from group IB, VI, VII and VIII of the periodic table and include in particular such metals as cobalt, iron, copper, nickel, manganese and chromium. Of these, it has been found that iron and copper salts are particularly effective in enhancing the reaction rate of this process. While the nature of the anion of the salt is not particularly critical, it has been found that such anions as sulfate, nitrate, oxalate and chloride may be employed satisfactorily. The amount of metal catalyst used should be in the range of from about 0.1 to 5.0 gms. per 50 to 75 gms. of alcohol-acid solution, and preferably from about 1.0 to 3.0 gms.

The hydroperoxides used in this process include both aliphatic and alicyclic compounds having from about 3 to 12 carbon atoms for example, alkyl hydroperoxides and methyl substituted cycloalkyl hydroperoxides. The hydroperoxides may be either secondary or tertiary compounds, although the latter type are more reactive and thus more effectively employed than are the secondary compounds. Typical amongst the aliphatic hydroperoxides are such compounds as t-butyl hydroperoxide or sec.-butylhydroperoxide, while the alicyclic hydroperoxides include such compounds as 1-methylcyclopentyl- and 1-methylcyclohexylhydroperoxide and the like. It should be understood that while the starting materials for this process desirably comprise pure hydroperoxide, these peroxides may, in fact, optionally contain admixed therewith small amounts of alcohols corresponding to the hydroperoxide, which alcohols are usually formed during the oxidation of the corresponding hydrocarbons to the respective hydroperoxide. These alcohols generally remain unchanged throughout the instant process.

When these and similar hydroperoxides are treated in accordance with this process, there are obtained the corresponding aliphatic and alicyclic ethers such as alkyl t-butyl ether, alkyl sec.-butyl ether, 1-methylcyclopentyl alkyl ether and the like.

The temperature employed in effecting this reaction should desirably be from about 20° to 80°C, and preferably from 50° to 60°C. Although the reactions can be carried out at atmospheric pressure to give high yields of the desired ethers, it has been found that the yields can be increase even further by conducting the reaction under autogenous pressure, as shown by the examples below.

It has also been found, in accordance with this invention, that there is produced concurrently with the desired ethers dialkoxyalkanes, the alkyl groups of which correspond to those of the alcohol solvent from which said dialkoxy compounds are apparently derived. Thus, for example, when the alcohol employed is methanol the resulting dialkoxyalkane is dimethoxymethane. Similarly, diethoxyethane is found in the reaction mixture when ethanol is employed. Although some of this additional product is found when any one of the metal salt catalyst is employed, it has been found that significant amounts are obtained when the salt is a ferrous or ferric salt.

The dialkoxyalkanes may readily be separated from the resulting ethers and recovered in pure form by simply distilling the reaction mixture to remove said alkanes. These products, and particularly dimethoxymethane, are useful in the manufacture of perfumes, synthetic resins and the like.

The following examples illustrate the invention.

EXAMPLE 1

Nine grams (0.1 moles) of t-butylhydroperoxide were added to a solution of 12.5 grams of 96 percent sulfuric acid in 50.0 grams methanol (20 weight percent) containing 1.0 grams of ferric sulfate [$Fe_2(SO_3)_3 \times H_2O$]. The solution was stirred for 4 hours at 55°C at atmospheric pressure.

The product was collected by stripping the reaction solution under reduced pressure. Analysis showed it to contain 4.4 grams (0.05 moles) of methyl t-butyl ether and 3.5 grams (0.046 moles) of dimethoxymethane, which was separated and recovered from the ether by use of a 60 plate distillation.

EXAMPLE 2

The procedure of Example 1 applied to 9.0 grams (0.1 moles) of t-BuOOH in a 20 weight percent solution of 96 percent sulfuric acid in methanol with 1.0 gram ferrous sulfate yields 4.2 grams (0.047 moles) of methyl t-butyl ether.

EXAMPLE 3

The procedure of Example 1 applied to 9.0 grams (0.1 moles) of t-BuOOH in a 20 weight percent solution of 96 percent sulfuric acid in ethanol with 1.0 gram ferric sulfate yields 2.3 grams (0.023 moles) of ethyl t-butyl ether.

EXAMPLE 4

The procedure of Example 1 as applied to 14.6 grams (0.1 moles) of dimethylneopentyl hydroperoxide yields 3.1 grams (0.022 moles) of the corresponding methyl ether.

EXAMPLE 5

The procedure of Example 1 as applied to 5.8 grams (0.05 moles) of 1-methylcyclopentyl hydroperoxide in $MeOH-H_2SO_4$ yields 1.43 grams (0.013 moles) of the corresponding methyl ether.

EXAMPLE 6

In accordance with the procedure of Example 1 a solution made up of 6.0 grams of Amberlyst 15 Resin (a sulfonic acid-type cation exchange resin made by Rohm and Haas, Phila., Pa.) in 15 grams of methanol with 1.0 gram of ferric sulfate was treated with 9.0 grams of t-BuOOH. The reaction was stirred for 4 hours at 65°C to yield 2.8 grams (0.032 moles) of methyl t-butyl ether.

EXAMPLE 7

The procedure of Example 1 as applied to 9.0 grams (0.1 moles) of t-butylhydroperoxide in a 20 weight percent solution of $H_2SO_4$ in methanol with 1.0 grams of ferric oxalate in place of the sulfate. The product contains 3.4 grams (0.039 moles) of methyl t-butyl ether.

EXAMPLE 8

The procedure of Example 1 except that 1.0 gram of nickelous sulfate was employed in place of ferric sulfate. The reaction yield 2.0 grams (0.023 moles) of methyl t-butyl ether.

EXAMPLE 9

The procedure of Example 1 as applied to 1.0 grams cupric chloride yields 2.8 grams (0.032 moles) of methyl t-butyl ether.

EXAMPLE 10

The procedure of Example 1 as applied to 25 weight percent of 100 percent $H_3PO_4$ in methanol yields 3.5 grams (0.04 moles) of methyl t-butyl ether.

EXAMPLE 11

A series of four runs was carried out using the procedures of Example 1 but varying the reaction conditions as to time and acid concentration. Two of the runs were carried out with 1.0 grams of ferric sulfate; in the other two runs, no metal salt of any kind was added. The results of these comparative tests were shown in Table 1 below.

Table 1

| Conditions | No Metal Salt | | 1.0 g $FE_2(SO_4)_3 \cdot xH_2O$ Added | |
|---|---|---|---|---|
| | Run 1 | Run 2 | Run 3 | Run 4 |
| Time (Hours) | 18 | 18 | 4 | 4 |
| Temp. (°C) | 55 | 55 | 55 | 55 |
| % $H_2SO_4$ in MeOH | 30 | 50 | 20 | 30 |
| Ether Yield (%) | 10 | 50 | 50 | 50 |

It will be seen from the foregoing that when ferric sulfate is added to the reaction mixture it is possible to obtain the same yield of ether as is obtained without the salt in less than one-fourth the time and with less than half the acid concentration. Compare, in particular, Runs 2 and 3. A study of Run 1, on the other hand, shows that the reduction of acid along from 50 percent to even 30 percent when no salt is present, results in a drastic drop in yield even when the reaction is allowed to continue for 18 hours as against 4 hours in Run 4 at the same concentration, but with a salt present. Putting it somewhat differently it will be seen when comparing Runs 1 and 4 that the addition of a metal salt results in a five-fold increase in yield of ether in less than one-fourth the time.

EXAMPLE 12

Nine grams (0.1 mole) of t-butyl hydroperoxide was slowly added to a 250 cc pressure bottle containing 100 grams of a 15 weight percent solution of concentrated sulfuric acid in methanol and 1.0 grams of ferrous sulfate. The solution was stirred for 4 hours at 60°C under autogenous pressure.

The product was worked up as described in Example 1 and the yields of methyl t-butyl ether and dimethoxymethane (based of t-butyl hydroperoxide charged) were 80 and 70 weight percent respectively.

EXAMPLE 13

The procedure of Example 12 was applied to a charge consisting of 0.05 moles of t-butyl alcohol (7.4 grams) and 0.05 mole of t-butyl hydroperoxide. The reaction conditions and quantities of acid, methanol and iron salt remained the same.

Analysis of the product showed it to contain 0.085 moles of methyl t-butyl ether and 0.04 moles of dimethoxymethane.

EXAMPLE 14

The procedure of Example 12 was again employed except that 2.0 grams of $Cu_2O$ was employed in place of the ferrous sulfate. Work-up yielded 0.080 moles of methyl t-butyl ether and 0.06 mole of dimethoxymethane.

What is claimed is:

1. A process for the preparation of alkyl ethers or methyl-substituted cycloalkyl ethers and dialkoxyalkanes which comprises reacting a secondary or tertiary alkyl hydroperoxide or methyl-substituted cycloalkyl hydroperoxide having from 3 to 12 carbon atoms with a lower alkanol having from one to four carbon atoms in the presence of an acid and metal salt or copper oxide catalyst at a temperature of from about 20° to 80°C wherein the acid concentration is from about 5 to 30 weight percent based on the weight of the acid-alkanol mixture, and wherein said metal salt is present in amounts of from about 0.1 to 5.0 grams per 50 to 75.0 grams of said acid-alkanol mixture, said acid being selected from the group consisting of hydrochloric acid, phosphoric acid, polyphosphoric acid, oleum, sulfuric acid, perchloric acid, a sulfonic acid-type cation exchange resin, and an acid treated molecular sieve, said metal of the metal salt being selected from Groups IB, VI, VII and VIII of the Periodic Table, and the anion of said metal salt being selected from sulfate, nitrate, and oxalate anions, and recovering the resulting ether and the dialkoxyalkane from the reaction mixture.

2. The process according to claim 1 wherein the metal salt is a ferrous, ferric or copper salt.

3. The process according to claim 1 wherein the reaction is carried out under autogenous pressure.

4. The process according to claim 1 wherein the hydroperoxide is t-butylhydroperoxide, the alkanol is methanol, the metal salt is ferrous or ferric sulfate and the product is a mixture of metyl t-butyl ether and dimethoxymethane.

5. The process according to claim 1 wherein the acid concentration is from about 15 to 20 weight percent based on the weight of the acid alkanol mixture.

6. The process according to claim 1 wherein the alkanol is methanol.

7. The process according to claim 1 wherein the alkanol is present in a molar excess of at least twice the number of moles of the hydroperoxide starting material.

8. The process according to claim 1 wherein the metal salt is a cobalt, nickel, manganese or chromium salt.

* * * * *